United States Patent [19]

Campbell

[11] 4,212,965
[45] Jul. 15, 1980

[54] POLYAMIDES WITH ELASTOMERIC CHARACTER FROM 5-METHYLNONAMETHYLENE DIAMINE

[75] Inventor: Robert W. Campbell, Bartlesville, Okla.

[73] Assignee: Phillips Petroleum Company, Bartlesville, Okla.

[21] Appl. No.: 635,006

[22] Filed: Nov. 25, 1975

[51] Int. Cl.² ............................................... C08G 69/26
[52] U.S. Cl. ............................... 528/340; 260/33.4 P; 260/9; 528/336; 528/349
[58] Field of Search .............. 260/78 R; 528/349, 340

[56] References Cited

U.S. PATENT DOCUMENTS

| | | | |
|---|---|---|---|
| 3,352,831 | 11/1967 | Schmitt et al. | 260/78 R |
| 3,575,935 | 4/1971 | Elam | 260/78 R |
| 3,776,890 | 12/1973 | Lee | 260/78 R |
| 3,980,621 | 9/1976 | Campbell et al. | 260/78 R |

Primary Examiner—Harold D. Anderson

[57] ABSTRACT

Normally solid, moldable polyamides, with elastomeric character, having diamine-derived structural units of the formula

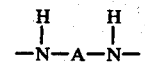

wherein each A is individually selected from the group consisting of 5-methylnonamethylene, 2,4-dimethyloctamethylene, 2,4,6-trimethylheptamethylene, and 4-isopropylheptamethylene; and diacid-derived structural units of the formula

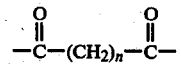

wherein each n is an integer individually selected from the group consisting of 5, 7, 9, and 11. Minor amounts of other polyamide-forming materials can be included in the polyamide to provide up to 30 percent of the nitrogen atoms and up to 30 percent of the carbonyl groups. These polyamides possess elastomeric or energy-absorbing character, as evidenced by their high impact strength, low flexural modulus, and high elongation.

29 Claims, No Drawings

POLYAMIDES WITH ELASTOMERIC CHARACTER FROM 5-METHYLNONAMETHYLENE DIAMINE

This invention relates to polyamides. In a specific aspect the invention relates to polyamides with elastomeric character formed from branched $C_{10}$ diamines and straight chain aliphatic dicarboxylic acids having 7, 9, 11 and/or 13 carbon atoms.

Most commercially available polyamides such as nylon 6,6 are stiff and hard at room temperature. Such polyamides are generally unsuitable for applications which require molding materials with substantial elastomeric character. Accordingly, it is an object of the invention to provide a new polyamide which has elastomeric characteristics. It is an object of the invention to provide a polyamide which is relatively flexible, softer than nylon 6,6, and capable of undergoing recoverable deformations. It is also an object of the invention to provide a polyamide which shows no break in the notched Izod impact test and has relatively high elongation. Another object of the invention is to provide energy-absorbing polyamides. Other objects, aspects, and advantages of the invention will be apparent from a study of the specification and the appended claims to the invention.

In accordance with the present invention it has been found that the foregoing objectives can be achieved by producing a polyamide having diamine-derived primary structural units of the formula

wherein each A is individually selected from the group consisting of 5-methylnonamethylene, 2,4-dimethyloctamethylene, 2,4,6-trimethylheptamethylene, and 4-isopropylheptamethylene; and diacid-derived primary structural units of the formula

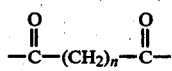

wherein each n is an integer individually selected from the group consisting of 5, 7, 9, and 11.

The A in each of the diamine-derived primary structural units can be solely 5-methylnonamethylene, 2,4-dimethyloctamethylene, 2,4,6-trimethylheptamethylene, or 4-isopropylheptamethylene, but preferably the polyamide contains a mixture of diamine-derived primary structural units wherein A in some of the units is 5-methylnonamethylene and the A in other units is 2,4-dimethyloctamethylene, with at least 20 percent, preferably at least 50 percent, more preferably at least 70 percent, and even more preferably at least 80 percent, by number, of the A's being 5-methylnonamethylene. Other isomeric diamine-derived primary structural units can be also present wherein the A in some of the units is 2,4,6-trimethylheptamethylene and/or the A in some of the units is 4-isopropylheptamethylene. In an exemplary embodiment, 20 to 96 percent, by number, of the A's are 5-methylnonamethylene, 4 to 80 percent, by number, of the A's are 2,4-dimethyloctamethylene, 0 to 25 percent, by number, of the A's are 2,4,6-trimethylheptamethylene, and 0 to 25 percent, by number, of the A's are 4-isopropylheptamethylene. In a presently preferred embodiment 70 to 96 percent, by number, of the A's are 5-methylnonamethylene, 4 to 30 percent, by number, of the A's are 2,4-dimethyloctamethylene, 0 to 15 percent, by number, of the A's are 2,4,6-trimethylheptamethylene, and 0 to 15 percent, by number, of the A's are 4-isopropylheptamethylene.

The diamine-derived primary structural units can be obtained from principal diamines having the formula $H_2N$-A-$NH_2$ wherein each A is individually selected from the group consisting of 5-methylnonamethylene, 2,4-dimethyloctamethylene, 2,4,6-trimethylheptamethylene, and 4-isopropylheptamethylene. The principal diamine can consist essentially of any one of 5-methyl-1,9-nonanediamine, 2,4-dimethyl-1,8-octanediamine, 2,4,6-trimethyl-1,7-heptanediamine, or 4-isopropyl-1,7-heptanediamine, or mixtures of any two or more thereof, but preferably comprises a mixture of 5-methyl-1,9-nonanediamine and 2,4-dimethyl-1,8-octanediamine, with the 5-methyl-1,9-nonanediamine constituting at least 20, preferably at least 50, more preferably at least 70, and even more preferably at least 80, mole percent of the mixture. 2,4,6-Trimethyl-1,7-heptanediamine and/or 4-isopropyl-1,7-heptanediamine can be present in the mixture. An exemplary suitable mixture for use as the principal diamine comprises 20 to 96 mol percent 5-methyl-1,9-nonanediamine, 4 to 80 mol percent 2,4-dimethyl-1,8-octanediamine, 0 to 25 mol percent 2,4,6-trimethyl-1,7-heptanediamine, and 0 to 25 mol percent 4-isopropyl-1,7-heptanediamine. A presently preferred mixture for use as the principal diamine comprises 70 to 96 mol percent 5-methyl-1,9-nonanediamine, 4 to 30 mol percent 2,4-dimethyl-1,8-octanediamine, 0 to 15 mol percent 2,4,6-trimethyl-1,7-heptanediamine, and 0 to 15 mol percent 4-isopropyl-1,7-heptanediamine.

The diacid-derived primary structural units can be obtained from principal diacid components having the formula

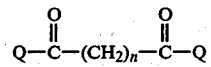

wherein each Q is individually selected from the group consisting of —OH, bromine, chlorine, alkoxy radicals having 1 to 4 carbon atoms, and phenoxy, and each n is an integer individually selected from the group consisting of 5, 7, 9, and 11. Preferably, each Q is —OH. Exemplary principal diacid components include pimelic acid, azelaic acid, undecanedioic acid, tridecanedioic acid, pimeloyl chloride, pimeloyl bromide, azelaoyl chloride, azelaoyl bromide, undecanedioyl chloride, undecanedioyl bromide, tridecanedioyl bromide, tridecanedioyl chloride, dimethyl pimelate, dibutyl pimelate, methyl ethyl pimelate, dimethyl azelate, dimethyl undecanedioate, dimethyl tridecanedioate, diisopropyl azelate, dibutyl tridecanedioate, diphenyl tridecanedioate, and the like, and mixtures of any two or more thereof.

If desired, the polyamide can contain secondary structural units derived from other diamines, diacids, amino acids and/or lactams. In such a polyamide the nitrogen atoms provided by the diamine-derived primary structural units constitute at least 70 percent, preferably at least 80 percent, more preferably at least 90 percent, and even more preferably at least 95 percent, by number, of the total nitrogen atoms in the polyamide. Similarly, the carbonyl groups provided by the diacid-derived primary structural units constitute at least 70 percent, preferably at least 80 percent, more preferably at least 90 percent, and even more preferably at least 95 percent, by number, of the total carbonyl groups in the polyamide.

The secondary structural units can have the formula

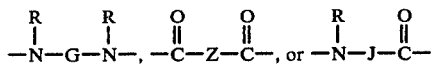

wherein each R is individually selected from the group consisting of hydrogen and alkyl radicals having from 1 to 6 carbon atoms per radical, each G is individually selected from the group consisting of divalent acyclic hydrocarbon radicals having from 6 to 16 carbon atoms, each Z is individually selected from the group consisting of divalent hydrocarbon radicals having from 4 to 12 carbon atoms, and each J is individually selected from the group consisting of divalent acyclic hydrocarbon radicals having from 5 to 13 carbon atoms. These secondary structural units can be obtained from one or more other diamines having the formula RHN—G—NHR, one or more other diacid components having the formula

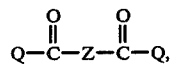

one or more amino acids having the formula RHN—J—CO$_2$H, and/or one or more lactams having the formula

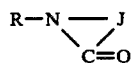

wherein R, G, Q, Z, and J are as hereinbefore defined, Q preferably being —OH.

Thus, there can be employed in the preparation of the polyamide a minor amount of a diamine such as hexamethylenediamine, octamethylenediamine, nonamethylenediamine, decamethylenediamine, hexadecamethylenediamine, N-methylhexamethylenediamine, N,N'-dimethylhexamethylenediamine (N,N'-dimethyl-1,6-hexanediamine), N,N'-diethylhexamethylenediamine, N,N'-diethyloctamethylenediamine, N-isopropyl-N'-butyldecamethylenediamine, N,N'-dihexylhexadecamethylenediamine, and/or a minor amount of a dicarboxylic acid or derivatives thereof such as adipic acid, suberic acid, sebacic acid, dodecanedioic acid, tetradecanedioic acid, 1,4-cyclohexanedicarboxylic acid, terephthalic acid, adipoyl chloride, suberoyl bromide, diphenyl adipate, dimethyl adipate, diethyl sebacate, dodecanedioyl chloride, diisopropyl suberate, dibutyl tetradecanedioate, or dimethyl terephthalate; and/or a minor amount of an amino acid such as 6-aminohexanoic acid, 8-aminooctanoic acid, 10-aminodecanoic acid, 12-aminododecanoic acid, N-methyl-6-aminohexanoic acid, N-ethyl-7-aminoheptanoic acid, N-isopropyl-12-aminododecanoic acid, or N-hexyl-14-aminotetradecanoic acid; and/or a minor amount of a lactam such as the lactam of any of the above-named amino acids. When present, the secondary structural units will generally provide from 0.01 to 30 percent, preferably from 1 to 25 percent, by number, of the nitrogen atoms and/or from 0.01 to 30 percent, preferably from 1 to 25 percent, by number, of the carbonyl groups in the polyamide.

The diamine(s) and the diacid component(s) can be individually introduced in the polycondensation reaction zone and therein be subjected to suitable polycondensation reaction conditions. Alternatively, at least a portion of the diamine(s) can be reacted with at least a portion of the dicarboxylic acid(s) to form the corresponding salt(s). The preformed salt(s), together with any additional amounts of diamine(s) and/or dicarboxylic acid(s), can be introduced into the polycondensation reactor and therein be subjected to suitable polycondensation reaction conditions. In the polycondensation reaction zone, the molar ratio of the total diamine(s) to the total diacid component(s) will generally be substantially 1:1, although a slight excess, e.g., up to 5 mol percent, of the diamine(s) or the diacid component(s) can be used.

The polyamides of this invention can be prepared under any suitable polycondensation conditions. In general, in a preferred procedure in which the diacid components are employed as dicarboxylic acids, the mixture of monomers and/or salts thereof can be heated at temperatures in the range of about 200° to about 340° C., preferably in the range of about 260° C. to about 320° C., for a period of time in the range of about 1 hour to about 24 hours, preferably in the range of about 1.5 hours to about 8 hours. The pressure normally reaches a maximum of not more than about 1000 psig, preferably not more than about 600 psig, and is allowed to diminish by venting gaseous material, sometimes with the aid of an inert gas, the final heating being conducted at a pressure as low as about 1 mm Hg, preferably in the range of about 10 to about 50 mm Hg. If desired, the mixtures of monomers and/or salts can be heated at a lower temperature, e.g., in the range of about 200° to about 230° C., for a period of time, e.g., in the range of about ½ hour to about 16 hours, prior to the heating to a temperature in the range of about 260° to about 320° C. Water can be present to serve as a heat transfer agent and to aid in keeping the reactants in the reaction zone. Acetic acid can be present, if desired, in an amount up to about 2 mole percent based on the total diacid, to control and stabilize the molecular weight of the polyamide. A thermoxidative stabilizer such as manganese lactate can be employed, if desired.

When diacid components other than dicarboxylic acids are employed, reaction conditions known in the art for use with such diacid components, sometimes differing from those described above, can be used in the production of the polyamides of this invention.

The polyamides of this invention can be employed as molding resins, hot melt adhesives, energy-absorbing materials, or in the production of coatings or films. In general the polyamides of this invention will have an inherent viscosity (as measured at 30° C. in a m-cresol solution having a polymer concentration of 0.5 gram/100 milliliters solution) of at least 0.4, preferably in the range of 0.6 to 2. In general, the polyamides of this invention will give a no break result in an Izod impact strength determination (ASTM D 256-56) conducted on notched specimens. The polyamides of this invention will generally have an elongation (ASTM D 638-68) of at least 700 percent, preferably at least 800 percent; and a flexural modulus (ASTM D 790-66) of less than 150,000 psi, preferably less than 130,000 psi.

The polyamides of this invention can be blended with various additives such as fillers, pigments, stabilizers, softeners, extenders, or other polymers. For example, there can be incorporated in the polymers of this invention substances such as graphite, carbon black, titanium dioxide, glass fibers, carbon fibers, metal powders, magnesia, silica, asbestos, wollastonite, clays, wood flour, cotton floc, alpha cellulose, mica, and the like. If desired, such additives can be added to the polymerization reactor.

The following data are presented in further illustration of the invention, but should not be construed in undue limitation thereof.

EXAMPLE I

In each of a series of runs a mixture of the isomeric diamines, the diacid, and distilled water were charged to a stirred autoclave. The autoclave was alternately pressured with nitrogen and evacuated several times, then sealed under a pressure of 40-60 psig nitrogen. The autoclave was then heated from about 25° C. to 210° C. during about ½ hour, maintained substantially at 210° C. for 1-2½ hours, heated from 210° C. to a temperature within the range of 280° to 300° C. during a period of ½ to 1 hour, and heated substantially at 280° to 300° C. for ½ to 1 hour, all the while venting as necessary to maintain the pressure generally at a value in the range of 400 to 500 psig, after this pressure was attained. Unless otherwise indicated, the autoclave was then heated substantially at 280° to 300° C., first for ½ hour while venting to 0 psig, then for ½ hour under a flow of nitrogen at substantially atmospheric pressure, then for ¼ to ½ hour while reducing the pressure to about 20 to about 25 mm Hg, and finally for ½ to 1 hour at about 20 to about 25 mm Hg. The resulting polyamide was removed from the autoclave, and properties thereof were determined. These properties are shown in Table I. Flexural modulus, tensile strength, elongation, Izod impact strength, heat deflection temperature, and hardness were determined on samples compression molded at 218° C., except in runs 3, 6, and 7, as noted in Table I. Also shown in Table I are properties of commercial nylon 6,6.

In run 1, properties shown are those for commercial nylon 6,6 as provided in *Plastics Technology*, 16, No. 10, 216 (1970).

In run 2, the charge was 112.7 g (0.65447 mole) of a mixture of isomeric diamines consisting of 88.6 mole percent 5-methyl-1,9-nonanediamine and 11.4 mole percent 2,4-dimethyl-1,8-octanediamine; 95.62 g (0.65447 mole) of adipic acid; and 45 g water.

In run 3, the charge was 2314.64 g (13.433 moles) of a mixture of isomeric diamines consisting of 89.8 mole percent 5-methyl-1,9-nonanediamine, 9.8 mole percent 2,4-dimethyl-1,8-octanediamine, 0.1 mole percent 2,4,6-trimethyl-1,7-heptanediamine, and 0.3 mole percent 4-isopropyl-1,7-heptanediamine; 1943.66 g (13.3 moles) adipic acid; 0.1984 g manganese lactate; and 1064.58 g water.

In run 4, the charge was 86.16 g (0.5 mole) of a mixture of isomeric diamines consisting of 89.6 mole percent 5-methyl-1,9-nonanediaimine, 10.0 mole percent 2,4-dimethyl-1,8-octanediamine, 0.1 mole percent 2,4,6-trimethyl-1,7-heptanediamine, and 0.3 mole percent 4-isopropyl-1,7-heptanediamine; 80.09 g (0.5 mole) pimelic acid; 0.005 g manganese lactate; and 42 g water.

In run 5, the charge was 86.16 g (0.5 mole) of the same mixture of isomeric diamines shown for run 4; 87.09 g (0.5 mole) suberic acid; 0.005 g manganese lactate; and 44 g water.

In run 6, the charge was 95.00 g (0.55168 mole) of the same mixture of isomeric diamines shown for run 2; 103.83 g (0.55168 mole) azelaic acid; and 45 ml water.

In run 7, the charge was 1202.72 g (6.98 moles) of the same mixture of isomeric diamines shown for run 3; 1313.77 g (6.98 moles) azelaic acid; 0.1189 g manganese lactate; and 629.12 g water. The final pressure used in the polymerization was about 75 mm Hg.

In run 8, the charge was 86.16 g (0.5 mole) of the same mixture of isomeric diamines shown for run 4; 101.13 g (0.5 mole) sebacic acid; 0.005 g manganese lactate; and 46.8 g water.

A comparison of the polyamides of the present invention (runs 4, 6 and 7) with nylon 6,6 (run 1) demonstrates that the polyamides of the present invention are tougher, based on Izod impact strength and elongation

TABLE I

| Run | Polymer[a] | I.V.[b] | Tm. °C.[c] | Izod I.S. ft-lb/in notch[d] | Elong. %[e] | Flexural Modulus, psi × $10^{-3}$[f] | T.S. psi[g] | Shore D Hardness[h] | H.D.T., °C. @264 psi[i] | L.S.S. psi[j] |
|---|---|---|---|---|---|---|---|---|---|---|
| 1 | 6,6 | | | 1.0 | 60 | 410 | 11,800 | | 104 | |
| 2 | MND,6 | 1.4 | 182 | 0.50 | 367 | 239 | 8,460 | 81 | 52 | |
| 3 | MND,6[k] | 1.2 | 182 | 0.54 | 675 | 182 | 8,630 | | | 2,210 |
| 4 | MND,7 | 1.4 | 127 | N.B. | 887 | 117 | 1,780 | | | 2,030 |
| 5 | MND,8 | 1.65 | 168 | 0.68 | 277 | 170 | 4,860 | | | 2,160 |
| 6 | MND,9[l] | 1.2 | 134 | N.B. | 1058 | 15 | 8,030 | 65 | 29 | 2,700 |
| 7 | MND,9[m] | 1.1 | 132 | N.B. | 1005 | 74 | 7,810 | | | |
| 8 | MND,10 | 1.3 | 158 | 0.79 | 430 | 150 | 6,450 | | | 2,280 |

[a]The first symbol indicates the diamine and the second symbol indicates the diacid employed to produce the polymer. The 6 diamine is hexamethylenediamine, and MND is a mixture of diamines comprising primarily 5-methyl-1,9-nonanediamine, described more fully below where the charge is shown for each run. The 6,7,8,9 and 10 diacids are adipic acid, pimelic acid, suberic acid, azelaic acid, and sebacic acid, respectively.
[b]Inherent Viscosity. Determined at 30° C. on a m-cresol solution having a polymer concentration of 0.5 g/100 ml solution.
[c]Determined by differential thermal analysis on premelted and quenched samples except in run 4, in which the determination was made on a stretched sample which was not premelted and quenched.
[d]Izod Impact Strength. ASTM D 256-56. N.B. signifies no break.
[e]Elongation. ASTM D 638-68.
[f]ASTM D 790-66.
[g]Tensile Strength. ASTM D 638-68. Values are for tensile strength at break except in run 4, in which value is for tensile strength at yield.
[h]ASTM D 2240-68.
[i]Heat Deflection Temperature. ASTM D 648-56.
[j]Lap Shear Strength. ASTM D 1002-72. Values are for aluminum-to-aluminum bonding.
[k]Properties of molded specimens were determined on samples injection molded at 230° C.
[l]Properties of molded specimens were determined on samples compression molded at 190° C.
[m]Properties of molded specimens were determined on samples injection molded at 190° C.

values, and substantially more flexible and softer, as indicated by the values for flexural modulus, than the nylon 6,6. A comparison of the polyamides of runs 4, 6 and 7 with the polyamides employing a diacid with an even number of carbon atoms (runs 2, 3, 5, and 8) demonstrates that the polyamides of the present invention are much tougher, based on Izod impact strength and elongation tests; more flexible, as indicated by the values for flexural modulus; and softer than the polyamides of diacids having an even number of carbon atoms. The polyamides of the present invention, being partially crystalline as well as soft and flexible, are capable of undergoing recoverable deformations. The lap shear strength values shown for the polyamides of runs 4 and 6 illustrate the utility of these polyamides as hot melt adhesives.

EXAMPLE II

This example describes the preparation of another polyamide composition within the scope of this invention.

To a small glass reactor were charged 0.7213 g (5 mmoles) N,N'-dimethyl-1,6-hexanediamine, 2.5840 g (15 mmoles) of a mixture of isomeric diamines consisting of 89.2 weight percent 5-methyl-1,9-nonanediamine and 10.8 weight percent 2,4-dimethyl-1,8-octanediamine, and 3.7640 g (20 mmoles) azelaic acid. The reactor contents were heated quickly from about 25° C. to 120° C., then heated from 120° C. to 210° C. during ½ hour, maintained at 210° C. for 7 hours, cooled and allowed to stand overnight at about 25° C., then heated from about 25° C. to 210° C. during 1 hour, maintained at 210° C. during 7 hours, cooled and allowed to stand overnight at about 25° C., then heated from about 25° C. to 210° C. during 1 hour, and heated from 210° C. to 280° C. during ½ hour, each of the steps of heating the mixture or of maintaining the mixture at 210° C. being conducted under nitrogen at a pressure of 10–20 psig. The reactor contents were then maintained at 280° C. for 1 hour while flushing the reactor with nitrogen at about atmospheric pressure, after which the reactor contents were maintained at 280° C. for 5½ hours under a nitrogen pressure of 20 mm Hg. The resulting light tan polyamide had an inherent viscosity of 1.03, determined as described in Example I; a polymer-melt temperature of 90° C., determined on a polymer sample placed on a heated bar with a temperature gradient; and a glass transition temperature of 18° C., determined by differential thermal analysis on a premelted and quenched sample. The polymer had a slight haze and was rubbery. Thus, as well as being partially crystalline, based on the lack of clarity, the polyamide was tough, flexible, and soft, and therefore would be capable of undergoing recoverable deformations. Approximately 25 percent, by number, of the nitrogen atoms in the polyamide were provided by secondary structural units having the formula

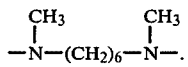

EXAMPLE III

This example describes the preparation of yet another polyamide composition within the scope of this invention.

To a small glass reactor were charged 0.2891 g (2 mmoles) N,N'-dimethyl-1,6-hexanediamine; 3,1011 g (18 mmoles) of a mixture of isomeric diamines consisting of 89.2 weight percent 5-methyl-1,9-nonanediamine and 10.8 weight percent 2,4-dimethyl-1,8-octanediamine; and 3.7867 g (20 mmoles) azelaic acid. The reactor contents were heated quickly from about 25° C. to 120° C., then heated from 120° C. to 210° C. during ½ hour, maintained at 210° C. for 7½ hours, cooled and allowed to stand overnight at about 25° C., then heated from about 25° C. to 210° C. during 1 hour, maintained at 210° C. during 6 hours, cooled and allowed to stand overnight at about 25° C., then heated from about 25° C. to 210° C. during 1 hour, and heated from 210° C. to 280° C. during ½ hour, each of the steps of heating the mixture or of maintaining the mixture at 210° C. being conducted under nitrogen at a pressure of 10–20 psig. The reactor contents were then maintained at 280° C. for 1 hour while flushing the reactor with nitrogen at about atmospheric pressure, after which the reactor contents were maintained at 280° C. for 5½ hours under a nitrogen pressure of 20 mm Hg. The resulting polyamide had an inherent viscosity of 1.22, a polymer-melt temperature of 110° C., and a glass transition temperature of 12° C., these values being determined by the methods described in Examples I and II. The polymer had a slight haze and was rubbery. Thus, as well as being partially crystalline, based on the lack of clarity, the polyamide was tough, flexible, and soft, and therefore would be capable of undergoing recoverable deformations. Approximately 10 percent, by number, of the nitrogen atoms in the polyamide were provided by secondary structural units having the formula

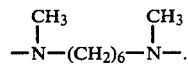

Reasonable variations and modifications are possible within the scope of the foregoing disclosure and the appended claims to the invention.

That which is claimed is:

1. A normally solid, moldable polyamide with elastomeric character comprising:

diamine-derived primary structural units of the formula

wherein each A is individually selected from the group consisting of 5-methylnonamethylene, 2,4-dimethyloctamethylene, 2,4,6-trimethylheptamethylene, and 4-isopropylheptamethylene; and diacid-derived primary structural units of the formula

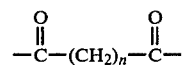

wherein each n is an integer and is 5, 7, 9, or 11; the nitrogen atoms provided by said diamine-derived primary structural units constituting at least 70 percent, by number, of the total nitrogen atoms in said polyamide; the carbonyl groups provided by said diacid-derived primary structural units constituting at least 70 percent, by number, of the total carbonyl groups in said polyamide; the balance, if any, of the nitrogen atoms and carbonyl groups in said polyamide being provided by secondary structural units selected from the group consisting of

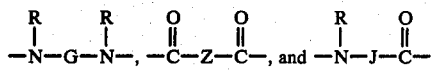

wherein each R is individually selected from the group consisting of hydrogen and alkyl radicals having from 1 to 6 carbon atoms per radical, each G is a divalent acyclic hydrocarbon radical having from 6 to 16 carbon atoms, each Z is a divalent hydrocarbon radical having from 4 to 12 carbon atoms, and each J is a divalent acyclic hydrocarbon radical having from 5 to 13 carbon atoms.

2. A polyamide in accordance with claim 1 wherein at least 80 percent, by number, of the nitrogen atoms in said polyamide are provided by said diamine-derived primary structural units, and at least 80 percent, by number, of the carbonyl groups in said polyamide are provided by said diacid-derived primary structural units.

3. A polyamide in accordance with claim 2 wherein at least 90 percent, by number, of the nitrogen atoms in said polyamide are provided by said diamine-derived primary structural units, and at least 90 percent, by number, of the carbonyl groups in said polyamide are provided by said diacid-derived primary structural units.

4. A polyamide in accordance with claim 3 wherein said polyamide is a linear polymer consisting essentially of said diamine-derived primary structural units and said diacid-derived primary structural units.

5. A polyamide in accordance with claim 4 wherein the A in at least 50 percent, by number, of said diamine-derived primary structural units is 5-methylnonamethylene and the A in each of the balance, if any, of said diamine-derived primary structural units is individually selected from the group consisting of 2,4-dimethyloctamethylene, 2,4,6-trimethylheptamethylene, and 4-isopropylheptamethylene.

6. A polyamide in accordance with claim 4 wherein each n is 5.

7. A polyamide in accordance with claim 4 wherein each n is 7.

8. A polyamide in accordance with claim 4 wherein each n is 9.

9. A polyamide in accordance with claim 4 wherein each n is 11.

10. A polyamide in accordance with claim 1 wherein the A in at least 20 percent, by number, of said diamine-derived primary structural units is 5-methylnonamethylene and the A in each of the balance, if any, of said diamine-derived primary structural units is individually selected from the group consisting of 2,4-dimethyloctamethylene, 2,4,6-trimethylheptamethylene, and 4-isopropylheptamethylene.

11. A polyamide in accordance with claim 10 wherein each n is 5.

12. A polyamide in accordance with claim 10 wherein each n is 7.

13. A polyamide in accordance with claim 10 wherein each n is 9.

14. A polyamide in accordance with claim 10 wherein each n is 11.

15. A polyamide in accordance with claim 1 giving a no break result in an Izod impact strength determination, as determined by the method of ASTM D 256-56 conducted on notched specimens.

16. A polyamide in accordance with claim 15 having an elongation value, as determined by the method of ASTM D 638-68, of at least 700 percent and a flexural modulus value, as determined by the method of ASTM D 790-66, of less than 150,000 pounds per square inch.

17. A polyamide in accordance with claim 15 having an elongation value, as determined by the method of ASTM D 638-68, of at least 800 percent and a flexural modulus value, as determined by the method of ASTM D 790-66, of less than 130,000 pounds per square inch.

18. A polyamide in accordance with claim 17 wherein the A in at least 70 percent, by number, of said diamine-derived primary structural units is 5-methylnonamethylene and the A in each of the balance, if any, of said diamine-derived primary structural units is individually selected from the group consisting of 2,4-dimethyloctamethylene, 2,4,6-trimethylheptamethylene, and 4-isopropylheptamethylene.

19. A polyamide in accordance with claim 1 wherein from 0.01 to 30 percent, by number, of the total nitrogen atoms in said polyamide are provided by secondary structural units having the formula

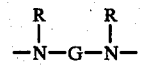

wherein at least one R is an alkyl radical.

20. A polyamide in accordance with claim 1 wherein from 0.01 to 30 percent, by number, of the total nitrogen atoms in said polyamide are provided by secondary structural units having the formula

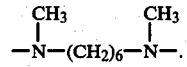

21. A polyamide in accordance with claim 18 wherein each n is 5.

22. A polyamide in accordance with claim 18 wherein each n is 7.

23. A polyamide in accordance with claim 18 wherein each n is 9.

24. A polyamide in accordance with claim 18 wherein each n is 11.

25. A polyamide in accordance with claim 15 wherein the A in at least 70 percent, by number, of said diamine-derived primary structural units is 5-methylnonamethylene and the A in each of the balance, if any, of said diamine-derived primary structural units is individually selected from the group consisting of 2,4-dimethyloctamethylene, 2,4,6-trimethylheptamethylene, and 4-isopropylheptamethylene.

26. A polyamide in accordance with claim 25 wherein each n is 5.

27. A polyamide in accordance with claim 25 wherein each n is 7.

28. A polyamide in accordance with claim 25 wherein each n is 9.

29. A polyamide in accordance with claim 25 wherein each n is 11.

* * * * *